Jan. 10, 1939.  L. Y. BOOHARIN  2,143,471
AIRPLANE WHEEL AND TIRE CONSTRUCTION
Filed Feb. 23, 1937
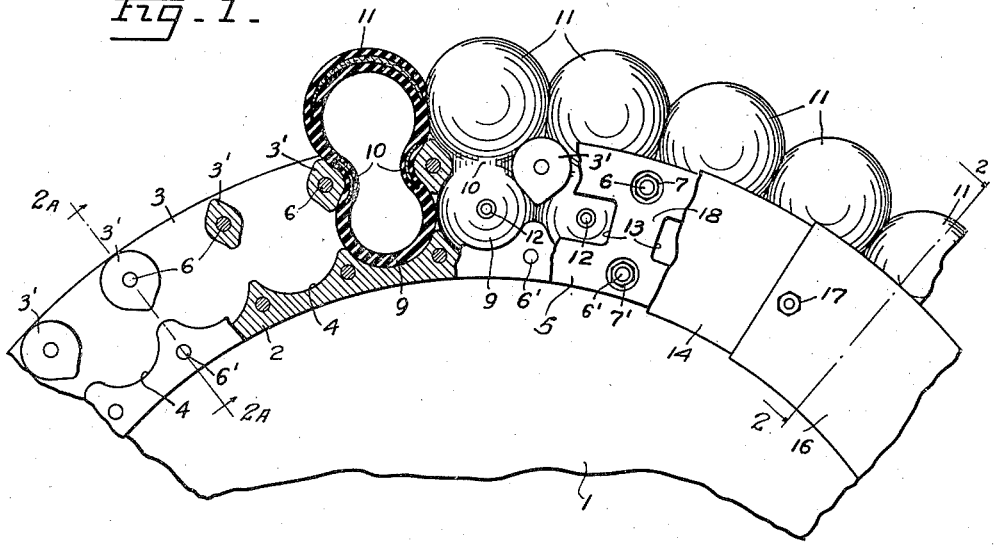
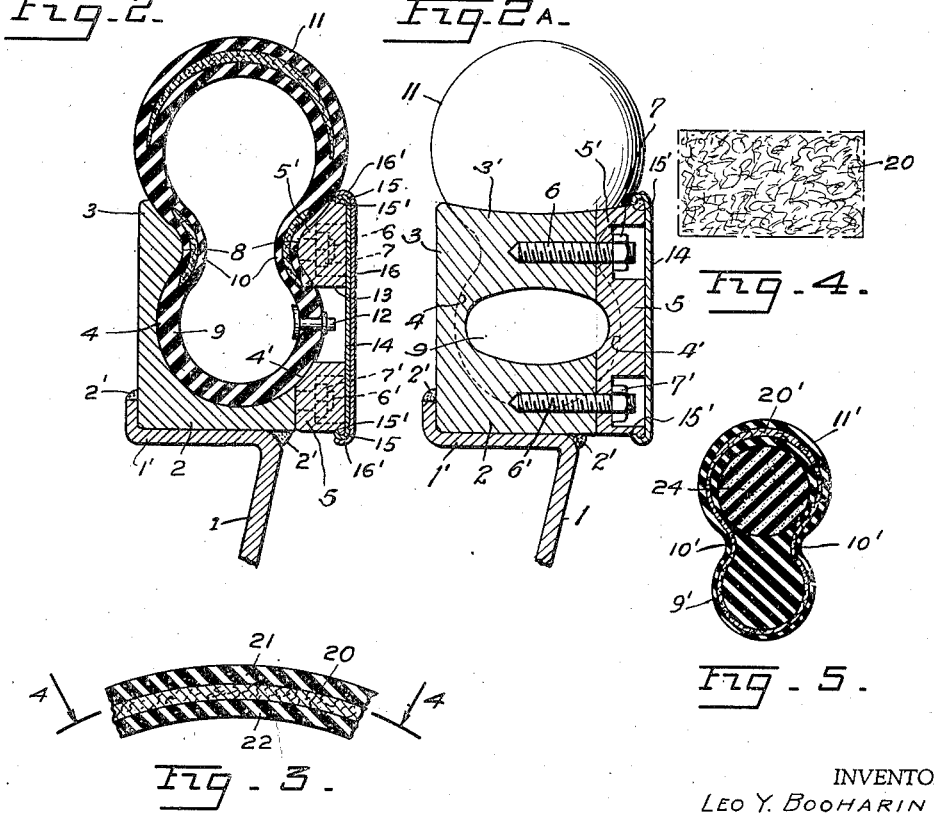
INVENTOR.
LEO Y. BOOHARIN
BY Boyken & Mohler
ATTORNEY.

Patented Jan. 10, 1939

2,143,471

UNITED STATES PATENT OFFICE 2,143,471

AIRPLANE WHEEL AND TIRE CONSTRUCTION

Leo Y. Booharin, San Francisco, Calif., assignor of one-fourth to J. Pack, one-fourth to Leon Scherbakoff, and one-fourth to George D. Collins, Jr.

Application February 23, 1937, Serial No. 127,037

7 Claims. (Cl. 152—336)

This invention relates to tires and wheels for airplanes, war-tanks, and the like, and has for its objects the provision of separately inflatable and separately removable and replaceable tire sections for each wheel in which the sections are adapted to be firmly held in place when they are inflated, but are quickly removable when deflated. Other objects and advantages will appear in the description and drawing annexed hereto.

Fig. 1 is a fragmentary side view of a portion of a wheel with the pneumatic tire sections thereon, the drawing showing certain parts broken away to clearly show the construction.

Fig. 2 is an enlarged sectional view of Fig. 1 taken along the line 2—2 thereof, and Fig. 2A is a reduced sectional view taken along the line 2A—2A of Fig. 1 showing all parts assembled.

Fig. 3 is an enlarged fragmentary sectional view through the tread wall of one of the tire sections.

Fig. 4 is a sectional view taken along line 4—4 of Fig. 3.

Fig. 5 is a sectional view through a modified form of tire section.

In detail each wheel includes a conventional circular disc portion, such as is indicated at 1, and having a felloe band 1' around its periphery which disc is centrally mounted for rotation in the conventional manner. On the band 1' a rim 2 is suitably secured, as by welding 2', said rim being provided with an upstanding flange 3 along one edge, preferably along the inner edge or edge adjacent the chassis of the vehicle. The outer side of rim 2 and the side of flange 3 adjacent thereto are formed to provide a row of substantially hemispherical outwardly opening sockets 4 and an annular ring 5 is secured by stud bolts 6, and nuts 7 to the flange 3 and rim 2 in opposed position relative to flange 3, the side of ring 5 adjacent flange 3 being recessed at 4' to form continuations of the hemispherical sockets 4. Thus when ring 5 is in position the sockets 4 and 4' together form substantially spherical pockets closed adjacent rim 2 but having circular outwardly opening restricted neck openings 8 adjacent the outer peripheral edges of the flange and ring. (See Fig. 2.) The walls at the neck openings taper away from the minimum diameter of said openings respectively, the portion of said walls around the inner side of the neck being in continuation of the walls of the spherical pockets. Flange 3 carries lateral projections 3' formed therewith adjacent its outer edge, which projections respectively define the portion of the neck openings between the pockets of the row, and which projections also carry the stud bolts 6 that are adapted to extend through holes carried in somewhat similar projections 5' on rim 5, the nuts 7 threadedly engaging the outer ends of the bolts for drawing projections 3', 5' together, while stud bolts 6', projecting from rim 2 extend through holes in the lower or inner marginal portion of ring 5 for engagement with nuts 7' outwardly of the ring to draw the inner marginal portion of the ring tightly against rim 2. The bolts 6, 6' and nuts therefore, may be variously positioned around the rim and flange as may be desired, according to whether or not the wheel is to be used to carry a heavy or a light load, in the former case, each projection may have a connecting bolt with a corresponding bolt on the rim, while in the latter instance, fewer may be used.

Within each of the aforesaid spherical pockets is snugly fitted separate means comprising a hollow ball 9, hereinafter termed "inner" ball, which ball has flexible walls and connects by a hollow neck 10 with a larger diameter outer ball or ground engaging element 11. The neck 10 fits snugly in the neck opening 8 and the tapered outer wall of the opening 8 seats snugly against the outer side of ball 11 adjacent neck 10. Thus substantially all of the outer ball is disposed outwardly of the outer peripheral edges of flange 3 and ring 5, and the balls 9, 11 are held against shifting longitudinally of the rows of balls by the projections 3' that extend between flange 3 and ring 5 across the adjacent necks 10 of the adjacent balls of the row.

Each of the balls 9 is provided with a short, outwardly projecting conventional tire valve 12 on the side adjacent ring 5, said ring being formed with openings or slots 13 for accommodating the outwardly projecting valves and through which openings the valves are accessible for attaching to a conventional fitting on the end of an air pressure line or hose as used in automobile service stations.

In order to protect the valves, and the inner balls 9 against mud, dirt, rain, etc., I provide an arcuately extending plate 14, preferably about semi-annular in form, which plate extends across the openings 13 for about half the distance around the ring 5. The opposite longitudinally extending margins 15 are formed to extend slightly over the outer and inner edges of ring 5 and to slidably engage in grooves 15' formed in the inner and outer edges of said ring. A second arcuate plate 16 extends over the remainder of the radially outer side of ring 5 and overlaps the ends of plate 15, which plate 16 has its marginal portions 16' slidably engaging over the margins 15 of plate 14, thus the plates 15, 16 are telescopically slidable one within the other around the ring 3. Preferably the plates 14, 16 extend slightly beyond half the length of ring 5, so as to be more secure against separation therefrom, but also I provide headed bolts 17, that extend through the overlapped ends of the plates 15, 16 and which bolts thread into threaded openings in portions 18 in ring 5 that separate the slots 13 from each other, so there is no chance of the plates becoming loose or uncovering the slots except when the bolts 17 are removed, and then the plates may be slid around the ring as desired to expose the valves in balls 9.

The walls of balls 9, 11 adjacent neck 10, and neck 10, and also the tread, or outermost walls of balls 11, are preferably formed of rubber with sheets of a mixture of batting, 20 (Figs. 3, 4) such as cotton, and steel wool, imbedded in the rubber, the proportion being about 50 to 90% batting to 5 to 10% steel wool, and the fibers of each are indiscriminately arranged, as is found in batten and steel wool, thus offering no obstacle to the ready molding of the balls and neck, yet fully reinforcing the walls against distortion in any direction. The remainder of balls 9 and 11 may also have the reinforcing fibers therein, but preferably are free from such reinforcement and relatively thick, so as to give the desired strength yet to permit expansion of said balls. An outer layer 21 and an inner lining 22 is integral with the balls and neck to prevent any leakage of air from within the balls.

It will be seen from the above construction, that upon inflation of the balls, the inner ball 9 will tend to become more and more secure in the pocket in which it is fitted, and the adjacent sides of outer balls 11 will tend to flatten as the elastic portions of the balls expand, to thus tend to level out the tread, although each of the outer balls will retain its identity and rounded tread or outer portion, as indicated in Fig. 1.

In operation, the ring 5 is first removed, and the balls 9, 11, are positioned around the rim 2 with one of the inner balls in each socket. The balls may then be partially inflated, and ring 5 bolted in place. The balls are then fully inflated to the desired degree, plates 14, 16 being slipped around to expose the valves 12 as desired. The plates 15, 16 are then locked in covering position by bolts 17.

In the event of a blow out or puncture of any one or several of the balls 11, the damaged balls are quickly removed, and new ones inserted, without necessitating the removal of ring 5, since the balls 9 may be flattened to slip through the neck openings. 8. The plates 15, or 16 are quickly slipped from over the desired slot 13 and the new ball is quickly inflated.

The relatively large number of balls around the wheel, insures against any injury to the vehicle since the balls 11 that are on opposite sides of the deflated ball are sufficiently close together to prevent any material jolting due to the absence of support from the injured ball 11.

It is, of course, obvious that I may use light resilient tire filler material 24 such as sponge rubber, or the like, within the balls 11' (Fig. 5) or balls 9' (Fig. 5) may be substantially solid and a filler used in balls 11 only, if desired, with the reinforcing material 20' around all the walls of both balls and neck 10'. This construction is particularly suitable for wheels mounting war tanks or fighting airplanes, which are subject to destruction from shrapnel or bullets, and the tread formation provides for good gripping characteristics on any surface.

Having described my invention, I claim:

1. In a wheel of the character described, an annular rim having a row of outwardly opening sockets on its outer peripheral side, an annular row of ground engaging elements disposed radially outwardly of the rim relative to its central axis, means removably fitting within each of said sockets, means connecting each of the separate means to a corresponding one of said elements, and means securing said separate means in said sockets.

2. In a construction as defined in claim 1, said elements being hollow and having flexible walls, and means for admitting air to within any one of said elements independently of the other elements of the row.

3. In a construction as defined in claim 1, each of said elements comprising a generally spherical ball and each of said first mentioned means comprising a generally spherical ball of lesser diameter than the diameter of the individual elements, and the means connecting the first mentioned means and elements together comprising a restricted neck portion formed integrally therewith.

4. In a wheel of the character described, an annular rim having a row of outwardly opening individual sockets on its outer peripheral side, an annular row of pairs of substantially spherical balls disposed outwardly of the rim, the balls of each pair being disposed in radial alignment relative to the central axis of the rim to provide an inner ball in each pair positioned adjacent said axis and an outer ball positioned radially outwardly of said inner ball relative to said axis with the inner balls of the pairs fitted within the sockets, means connecting the balls of each pair together and means securing the inner balls within said sockets.

5. In a construction as defined in claim 4, said means connecting the balls of each pair together being a restricted neck portion formed integrally with each pair of balls.

6. In a construction as defined in claim 4, said balls being hollow and the means connecting the balls of each pair being a restricted neck portion formed with a passageway connecting between the interiors of each pair of balls, the walls of the balls and neck portions being of material impervious to the passage of air therethrough, and means for admitting air under pressure to within the inner ball of each pair for passage of the air through the passageway into the outer ball of each pair.

7. A wheel of the character described, having a ground engaging tread portion including an annular row of generally globular-shaped pairs of hollow devices connected together on adjacent sides and a passageway communicating between the insides of the devices of each pair at their point of connection, the walls of said devices being of rubber and the devices of each pair being arranged co-axially with lines extending radially of the central axis of the wheel, means for supporting and positioning the pairs of devices in an annular row around the peripheral portion of the wheel and means adjacent each pair of devices arranged and adapted to prevent shifting of the pairs of devices longitudinally of the row, the walls of said devices including fibrous material imbedded therein in which the fibers thereof are intermingled in indiscriminately extending relationship.

LEO Y. BOOHARIN.